(12) United States Patent
de Goycoechea

(10) Patent No.: US 12,520,244 B2
(45) Date of Patent: Jan. 6, 2026

(54) GAIN AUTOTUNE

(71) Applicant: Fiplex Communications, Inc., Doral, FL (US)

(72) Inventor: Ricardo Matias de Goycoechea, Cordoba (AR)

(73) Assignee: Fiplex Communications, Inc., Doral, FL (US)

( * ) Notice: Subject to any disclaimer, the term of this patent is extended or adjusted under 35 U.S.C. 154(b) by 371 days.

(21) Appl. No.: 18/121,552

(22) Filed: Mar. 14, 2023

(65) Prior Publication Data

US 2023/0292253 A1 Sep. 14, 2023

Related U.S. Application Data

(60) Provisional application No. 63/319,631, filed on Mar. 14, 2022.

(51) Int. Cl.
*H04W 52/24* (2009.01)
*H04W 52/14* (2009.01)

(52) U.S. Cl.
CPC ....... *H04W 52/241* (2013.01); *H04W 52/146* (2013.01)

(58) Field of Classification Search
CPC ... H04W 52/146; H04W 52/14; H04W 52/24; H04W 52/241
See application file for complete search history.

(56) References Cited

U.S. PATENT DOCUMENTS 10,523,262 B2 * 12/2019 Hwang ................ H04B 1/401
2004/0166802 A1 * 8/2004 McKay, Sr. ......... H04B 7/1555
455/7

* cited by examiner

*Primary Examiner* — Tuan H Nguyen
(74) *Attorney, Agent, or Firm* — Rafael Perez-Pineiro; The Brickell IP Group, PLLC

(57) ABSTRACT

A server received information about the power level of uplink signals received by a base station and about the power level of those signals when transmitted to the base station by a bidirectional amplifier or Master Unit. Based on the power level measurements, the server calculates the amplification parameters to adjust the gain or output power of the bidirectional amplifier or Master Unit.

13 Claims, 19 Drawing Sheets

1901

GAIN AUTOTUNE

CROSS REFERENCE TO RELATED APPLICATIONS

This application claims the benefit of U.S. Provisional Application No. 63/319,631 filed Mar. 14, 2023, the disclosure of which is hereby incorporated herein by reference in its entirety.

FIELD OF THE DISCLOSURE

This disclosure relates generally to communication systems for distributing signals in a communications network.

BACKGROUND

The use of Signal Boosters, also called bidirectional amplifiers ("BDA"), and of distributed antenna systems ("DAS"), is the most popular method for extending the coverage of two-way radio systems in locations without coverage, such as buildings, tunnels, subways, as well as open areas such as canyons, cliffs, and valleys, among others. BDA and DAS are bidirectional amplification devices, which may have two or more amplifiers in anti-parallel configuration, to provide simultaneous amplification to the downlink and uplink signals. Downlink signals are transmitted by the Base Station towards the Radios or Terminal Units, and the Uplink signals are transmitted by the Radios or Terminal Units towards the Base Station. The BDA and DAS amplify the signals that, due to physical barriers, cannot propagate and therefore, suffer high attenuation. Being an amplifier, the BDA and DAS do not only amplify the signals but also the noise. Due to the physics associated with electronics and the transmission of radio frequency ("RF") signals, the active components in the amplifiers also generate noise that is added to the amplified noise as the signal passes through the amplification stages. The noise in the uplink signal seriously impacts the performance of the Base Station receivers, and affects their capability to properly receive signals from Radios located at distances far away from the Base Station. This is known as the Near-Far effect and affects all two-way radio Base Stations that serve BDA and DAS. As a result, the effective coverage area of a two-way Base Station is reduced from its original designed coverage area, which seriously impacts the ability of two-way Radio users located far away from the Base Station to obtain radio service. In order to minimize the Near-Far effect, it is important that the BDA and DAS be adjusted with minimum uplink gain in order to secure the functionality that would allow for minimum amplified noise to be radiated to the Base Station, thereby reducing its impact on the Base Station performance.

Also, in order to minimize the Near-Far effect, it is important to reduce the uplink noise being generated by a BDA or DAS system towards the Base Station receiver. Another aspect about the BDA and DAS is the ability to control the output power of the amplified signals within certain levels, so that amplified uplink signals can reach the Base Station with the proper power level (i.e., not too low so that it can be received properly, and not too high to avoid saturation of the receiver of the Base Station). The main constraint of the BDA and DAS is that the input signals they receive from the Terminal Units vary in input power and also in the number of different signals that are input to the BDA or DAS, depending on the number of users inside the indoor coverage area. If just one user is present in the coverage area of the BDA or DAS, then only one signal is handled by the BDA or DAS. If there are ten users then (1) ten signals will be handled by the BDA or DAS if the wireless system is conventional analog, or (2) a minimum of five signals will be handled if the system is P25 using TDMA with two slots (10 users, 2 slots per carrier, and 5 carriers or signals). Because the BDA or DAS has a maximum output power, then one signal may take up full power. If two signals are being handled by the BDA or DAS, then each signal may take up half of full power each, and if ten signals are being handled then each signal takes up one tenth of the maximum power. This makes it difficult for the BDA and DAS to maintain the output power of every output signal constant (per signal) when the input power and the number of received different signals vary.

Present Solutions

Traditionally, the uplink gain of a BDA or DAS is calculated based on the downlink indoor simulation and the calculated link budget. This is a good estimate but does not provide optimum results since the indoor simulation and link budget calculations are only approximations, including a certain tolerance. This does not ensure that the minimum gain is used, and thus, does not ensure that the minimum noise is being generated and radiated towards the Base Station.

In order to control the output noise, a BDA or DAS may be equipped with uplink squelch functionality, which turns off the uplink amplification chain within the BDA or DAS, totally or partially, when there are no uplink signals entering the BDA or DAS at the uplink input ports, or when the uplink signals entering the BDA or DAS at the uplink input ports have a power level that is lower than a predefined value. When the BDA and DAS do not have the capability to amplify only the desired signals, meaning that they have no channel filter capabilities, any signal being received by the BDA and DAS at the input (typically in the uplink direction when squelching is implemented) and that has a certain minimum power level triggers the squelch and activates the amplification chain, radiating noise to the Base Station without any desired signal being amplified.

There are basically two great families of BDA and DAS: channel selective or band selective. Even being channel selective, due to certain group delay constraints, the channel filter can be (and typically is) wider than the radiocommunications channel bandwidth, so even on a channel selective BDA or DAS more than one desired RF communication signal may pass through the BDA or DAS channel filter. While this may occur in both uplink and downlink directions, when squelch functionality is implemented the effect is typically related to uplink.

Also, if the noise floor of the indoor area is higher than expected, once the squelch is triggered the output noise will be higher than expected because the excessive input noise related to the high noise floor is amplified due to the excessive input noise, to the noise figure of the amplifier, and to the amplifier gain.

In order to control the output power of the signals, a BDA or DAS may be equipped with circuitry that controls the amplification gain based on a desired output power, in order to set the output power up to a certain predefined value. In some cases, the BDA or DAS may monitor the power per channel, while in some other cases the BDA or DAS may control the total power, which is the sum of the power of all the signals at the output (uplink or downlink). Typically, the BDA or DAS may set the output power level up to a maximum predefined value by modifying the amplification gain. However, sometimes the predefined value cannot be modified by the operator/user of the BDA or DAS. The maximum predefined value may be defined by the manufacturer due to the RF design done so that (1) the linearity of the amplifier does not create intermodulation that is higher than FCC or ETSI regulations, and (2) the linear response of the amplifier can manage the peak power due to having multiple carriers.

Therefore, there is a need in the art for an improved method and system for reducing the Near-Far Effect in a wireless communications system.

BRIEF SUMMARY OF THE DISCLOSURE

The following presents a simplified summary of the disclosure in order to provide a basic understanding of some aspects of the various embodiments disclosed herein. This summary is not an extensive overview of every detail of every embodiment. It is intended to neither identify key or critical elements of every embodiment nor delineate the scope of every disclosed embodiment. Its sole purpose is to present some concepts of disclosure in a simplified form as a prelude to the more detailed description that is presented later.

Disclosed is a communication system that includes a base station for receiving uplink radio frequency signals from a bidirectional amplifier or Master Unit and for measuring a first power level of the uplink radio frequency signals when received by the base station; a site monitor, adjacent to the base station, for receiving the uplink radio frequency signals from the bidirectional amplifier or Master Unit and for measuring a second power level of the uplink radio frequency signals when received by the site monitor; and a server in communication with the base station or the site monitor and in communication with the bidirectional amplifier or Master Unit. The server is configured to receive information corresponding to the first power level from the base station or the second power level from the site monitor. The bidirectional amplifier or Master Unit measures a transmitted power level of the uplink radio frequency signals when transmitted by the bidirectional amplifier or Master Unit and the server is configured to receive information corresponding to the transmitted power level from the bidirectional amplifier or Master Unit. The server calculates amplification parameters for the bidirectional amplifier or Master Unit based on the power level of the signal received by the base station or site monitor and the uplink output power lever transmitted by the bidirectional amplifier or Master Unit and sends the calculated parameters to the bidirectional amplifier or Master Unit for gain adjustment.

The following description and annexed drawings set forth certain illustrative aspects of the disclosure. These aspects are indicative, however, of but a few of the various ways in which the principles disclosed may be employed. Other advantages and novel features disclosed herein will become apparent from the following description when considered in conjunction with the drawings.

BRIEF DESCRIPTION OF THE FIGURES

The drawings, in which like numerals represent similar parts, illustrate generally, by way of example, but not by way of limitation, various embodiments discussed in the present document.

DETAILED DESCRIPTION OF THE DISCLOSURE

The foregoing summary, as well as the following detailed description of certain embodiments of the subject matter set forth herein, will be better understood when read in conjunction with the appended drawings. In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that variations may be made without departing from the scope of the subject matter disclosed herein. It should also be understood that the drawings are not necessarily to scale and in certain instances details may have been omitted, which are not necessary for an understanding of the disclosure, such as details of fabrication and assembly. Furthermore, references to "one embodiment" are not intended to be interpreted as excluding the existence of additional embodiments that also incorporate the recited features. The following detailed description is, therefore, not to be taken in a limiting sense, and the scope of the subject matter disclosed herein is defined by the appended claims and their equivalents.

The present disclosure describes a system that solves the problems with the prior art. The exemplary implementations disclosed herein in FIGS. 1-15 include a mechanism to properly adjust the uplink gain of a BDA or DAS based on feedback information from the Base Station or other power reading devices located away from the BDA or DAS.

Figure 1:
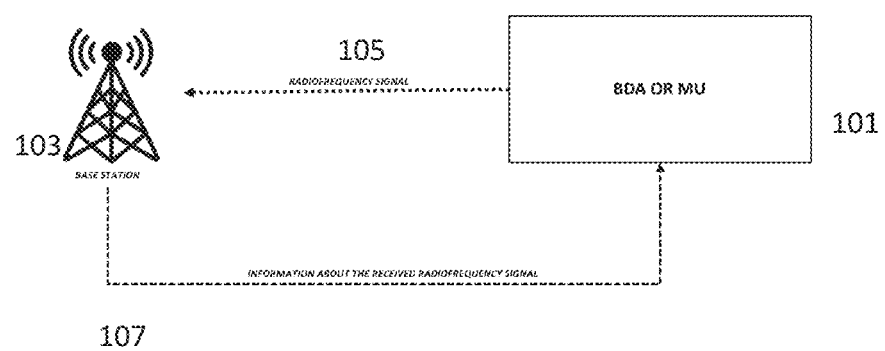
FIG. 1 illustrates a system to reduce the Near-Far effect in a wireless communication system including a base station transceiver and a bidirectional amplifier or Master Unit in accordance with one embodiment.

FIG. 1 shows a BDA or a DAS Master Unit ("MU") 101 that is transmitting at least one radiofrequency signal 105 towards at least one Base Station receiver 103. The BDA 101 measures the power of the signal received by the Base Station 103 via a feedback wired or wireless connection 107 from the Base Station. The signal power information is received directly or indirectly from the Base Station 103 and using that information, the BDA 101 adjusts the uplink gain or uplink maximum output power level in order to allow the signal to be transmitted with the proper power to reach the Base Station 103 set at a predefined value. There is no BDA or DAS in the market that has this automatic capability to adjust the uplink gain by receiving information from the base station. By not having the automatic control, it is very difficult or impossible to properly set the uplink gain at a proper level in order to improve the reception performance and at the same time to accomplish the minimum degradation on the base transceiver station (BTS) receiver due to excessive BDA or DAS uplink gain. This setup is dynamic, meaning that once a day or once an hour or once a week, the BDA adjusts its uplink gain based on the received information. For example, the gain may be adjusted by measuring the power of the amplified uplink signal prior to being sent to the BTS antenna, receiving from the base station the measured received signal strength of the same amplified signal, and if that signal received by the BTS was too strong, then the amplification gain is reduced to meet a specific maximum strength for signals to be received at the base station. By contrast, if the signal received by the BTS is too weak, then the amplification gain is increased to generate a stronger uplink signal prior to transmitting the signal to the BTS antenna, so the received signal at the base station is at a proper level. A radio network administrator may define or set what is the optimum, maximum or minimum signal strength that an uplink signal from the coverage extension system should have when received by the base station, and that signal strength parameter may be used when calculating the gain adjustments.

Figure 2:
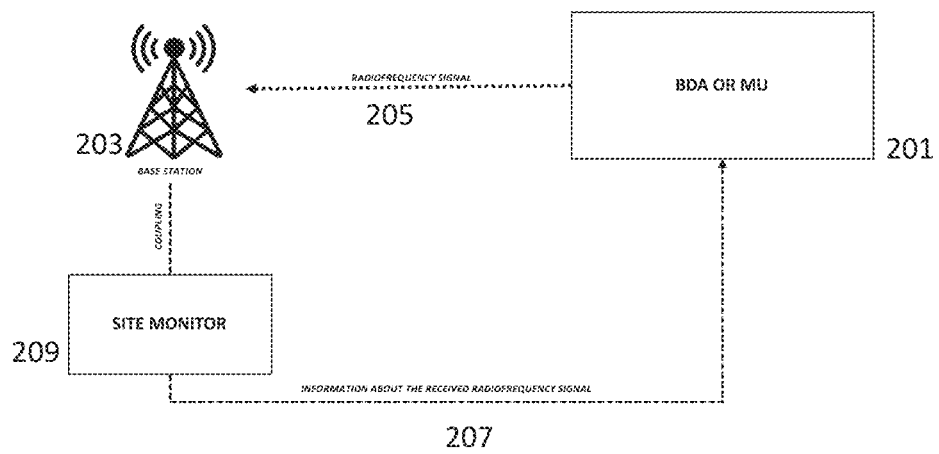
FIG. 2 illustrates a system to reduce the Near-Far effect in a wireless communication system including a base station transceiver, a site monitor, and a bidirectional amplifier or Master Unit in accordance with one embodiment.

FIG. 2 shows a Site Monitor Box that is located near or adjacent to the Base Station 203 (for example 50 meters) and is coupled to at least one Base Station receiver or at least one Base Station antenna. The Site Monitor Box 209 is hard wired or connected wirelessly 207 to the BDA or MU 201 and provides information to the BDA or MU about the power level of the uplink signal received at the Base Station receiver 203. Using that information, the BDA or MU 201 thereafter adjusts the uplink signal transmission power level. The site monitor 209 takes readings and communicates with the BDA or DAS 201 with respect to the signal strength received at the base station 203, where the site monitor 209 is coupled to the base station antenna system.

Figure 3:
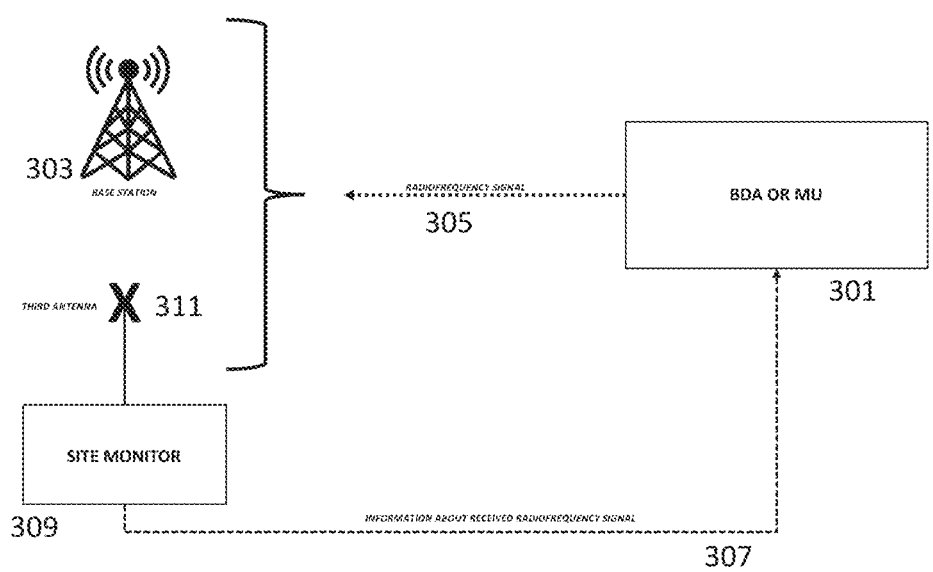
FIG. 3 illustrates a system to reduce the Near-Far effect in a wireless communication system including a base station transceiver, a site monitor, and a bidirectional amplifier or Master Unit in accordance with one embodiment.

FIG. 3 shows the same scenario as FIG. 2, but the Site Monitor Box 309 is connected to a third antenna 311 which receives the BDA or MU 301 transmitted radiofrequency signal. In this implementation the site monitor 309 is located near the base station 303 but with its independent antenna/s 311 and not sharing the base station antenna/s. This configuration may be used when the base station antennas are not reachable or cannot be used and the site monitor 309, by being located near the base station 303, receives the same signal that the base station 303 receives. The site monitor 309 transmits to the BDA or DAS 301 the information about the received signal strength via any type of connection 307 (dedicated link, internet connection, microwave link, among others). The BDA or DAS 301 receives the information and its own "intelligence" does the math (i.e., performs the calculations to define, for the BDA or DAS 301, an optimal gain and output power levels), by processing the information received from the BTS 303 or site monitor 309, and its own measurements of the transmitted power, in order to make the adjustments internally to reach the proper gain level.

Figure 4:
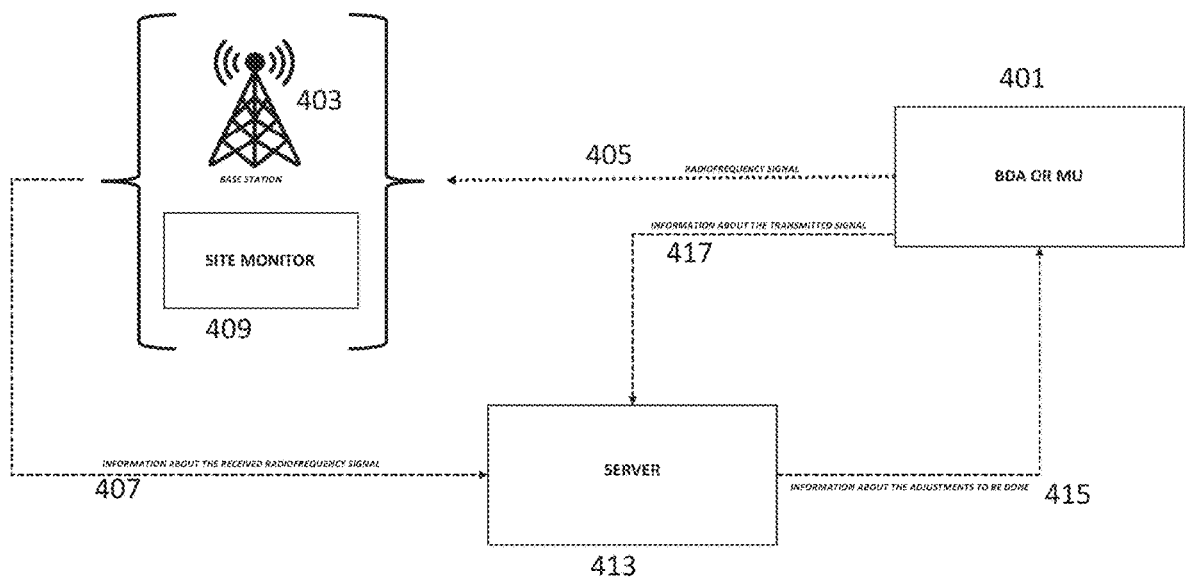
FIG. 4 illustrates a system to reduce the Near-Far effect in a wireless communication system including a base station transceiver, a server, a site monitor, and a bidirectional amplifier or Master Unit in accordance with one embodiment.

FIG. 4 shows a Server 413 that is connected to the Base Station receiver 403 and/or the Site Monitor Box 409 and connected to the BDA or MU 401. The Server 413 receives information 407 from the Base Station receiver 403 or Monitor Box 409 about the power level of the uplink signal received at the Base Station receiver 403 or Site Monitor Box 409. The Server 413 also receives information 417 from the BDA or MU about the power level of the uplink transmitted signal. The server 413 is connected to the BDA or DAS 401 and receives the information that the BDA or DAS measured about the transmitter output power. The Server 413 is connected to the BDA or DAS via any type of data connection such as Internet connection, microwave link, dedicated fiber link, amongst others (any link that can be used to send and receive data). This allows the Server 413 to indicate the necessary adjustments 415 that the BDA or MU 401 should perform over the uplink parameters. The server 413, by collecting the data 407 from the site monitor and collecting the data 417 from the BDA or DAS, can make the calculations to define, for the BDA or DAS 401, an optimal gain and output power levels, and thus determine how many decibels the BDA or DAS 401 should increase or decrease the uplink gain by in order for the BDA or DAS transmitted signals to reach the base station 403 with an acceptable signal level in order to be able to establish communications but not to negatively impair or degrade the base station receiver performance. Excessive uplink gain does not affect the BDA or DAS performance but affects the base station reception performance, degrading the macro coverage, so it is important to have a coordinated adjustment.

Another embodiment includes the same Server 413 of FIG. 4 but instead of the Server indicating to the BDA or MU 401 the adjustments that should be performed over the uplink parameters, such as uplink gain or uplink maximum output power level, the Server 413 provides the BDA or MU information about the power level of the uplink signal received at the Base Station receiver 403 or Site Monitor Box 409. Using this information, the BDA or MU 401 adjusts the uplink parameters. For example, if the BDA or DAS learns that the transmitted signal reaches the base station at an −80 dbm level, and the BDA or DAS user "defined" value is −95 dbm, then the BDA or DAS knows that it should reduce its uplink gain by 15 db. After reducing the gain, the transmitted signal will reach the base station (and site monitor) with −95 dbm which is the user defined level. The "user" is the person that installed and/or owns and/or administrates the BDA or DAS installation. Some BDAs and DAS elements (MUs and RUs) include circuitry that allows for modifications or control in the amplifying chain. The BDA and DAS are basically amplifiers, that can be analog, digital or a mix of the two technologies. The amplifier may be managed by a central controller unit, or microcontroller, that manages all the operational values of the BDA or DAS, and that at the same time can measure the output power and knows the gain being applied to that amplified signal, so using radiofrequency variable gain amplifiers, or radiofrequency attenuators, such microcontroller unit can control the overall gain.

Figure 5:
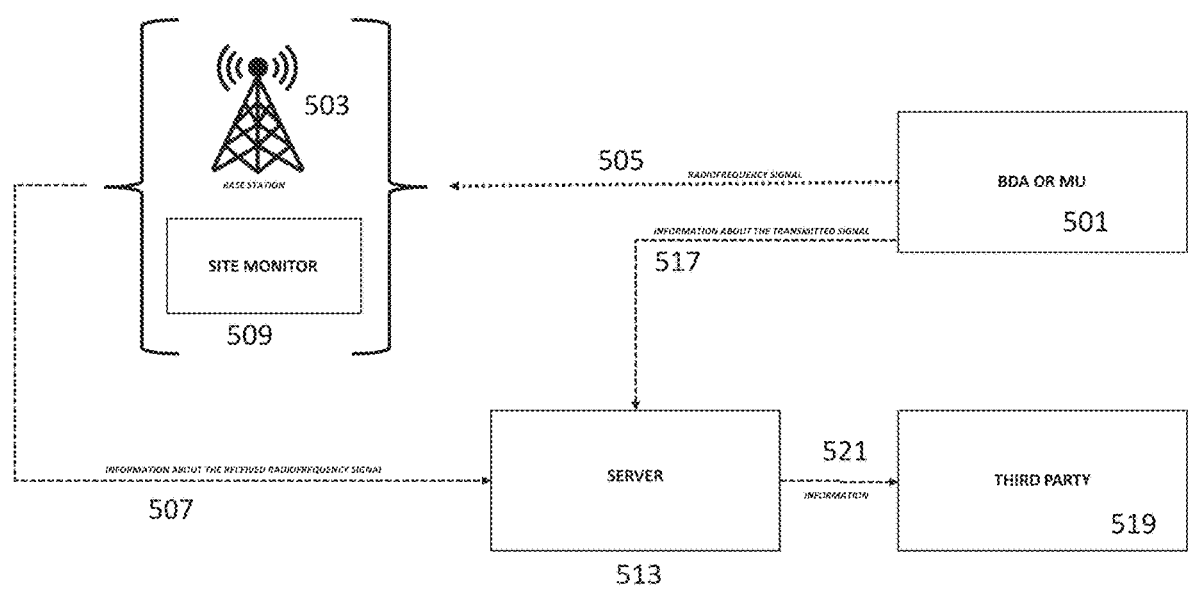
FIG. 5 illustrates a system to reduce the Near-Far effect in a wireless communication system including a base station transceiver, a server, a site monitor, a BDA monitor, and a bidirectional amplifier or Master Unit in accordance with one embodiment.

FIG. 5 shows the same scenario as FIG. 4, but the Server 513 provides a third party 519 the information 521 about the power level of the uplink signal received at the Base Station receiver 503 or Site Monitor Box 509, and/or information 521 about the power level of the uplink signal transmitted by the BDA or MU 501. The third party 519 can be a software, or a graphical interface, or can be the system manager, or any other third party.

In another embodiment the Server 513 provides information to the third party 519 about the adjustments needed on the BDA or MU uplink parameters. The third parties that receive reports with signal levels and the adjustments include fire marshals, NMA or any other system.

Figure 6:
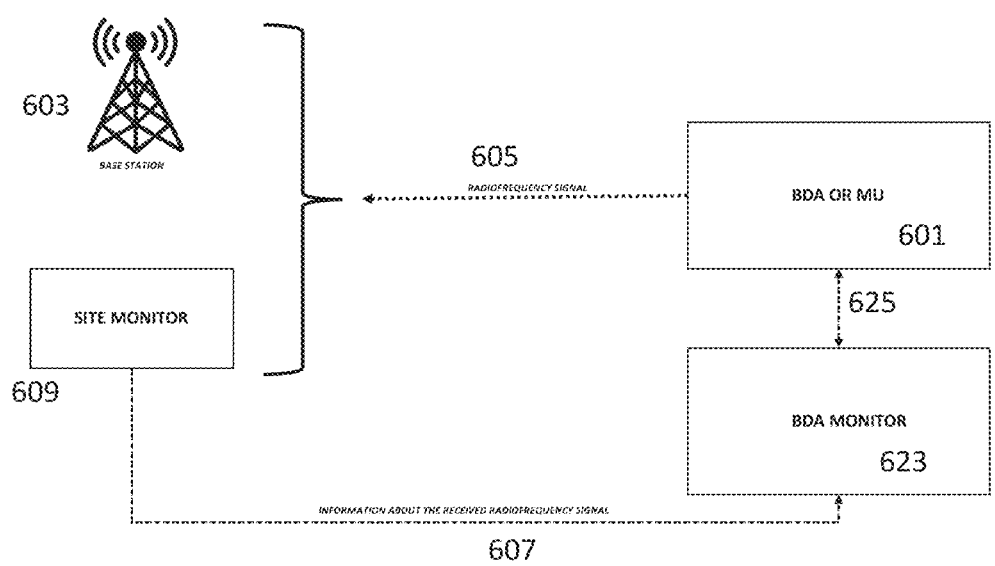
FIG. 6 illustrates a system to reduce the Near-Far effect in a wireless communication system including a base station transceiver, a site monitor, a BDA monitor, and a bidirectional amplifier or Master Unit in accordance with one embodiment.

FIG. 6 shows a BDA or a DAS MU 601 that is transmitting at least one radiofrequency signal towards at least one Base Station receiver 603, a BDA Monitor 623 that is hardwired or wirelessly connected 625 to the BDA or MU 601, where the BDA or MU 601 provides to the BDA Monitor 623 information about the power level of the uplink RF signal transmitted by the BDA or MU 601, and via a wired or wireless connection 607, the BDA Monitor 623 receives information directly or indirectly from the Base Station 603 and/or Site Monitor 609 about the power level of the uplink RF signal received by the Base Station 603 or Site Monitor 609. Using the information about the power level of the uplink signal received at the Base Station, the BDA Monitor 623 adjusts the BDA or MU uplink gain or uplink maximum output power level in order for the signal to be transmitted with the proper power to reach the Base Station at a predefined value.

In the illustrated embodiment, the BDA or DAS 601 is not capable to do perform the calculation for gain adjustment. There are some BDA or DAS in the market that are simple and are not able to perform calculations, like having a limited microcontroller unit, or basically not having it, so it would require another device or software module to perform those calculations for it. For example, in this embodiment the bidirectional arrow between the BDA 601 and the BDA monitor 623 indicates that there is a bidirectional communication that can be established between the two, for example, when the BDA monitor 623 requests the BDA or MU 601 information about the transmitted power, the BDA monitor 623 calculates the gain adjustment (based on the received information from the site monitor 609 or base station 603, and the BDA or MU 601) and then instructs the BDA or MU 601 which is the new uplink gain value that the BDA or MU should be set to.

In another embodiment the BDA Monitor 623 provides either the information corresponding to the power level of the RF uplink signal received by the Base Station 603 or instructions about the adjustments to be made on the uplink parameters to a third party, where a third party can be a software, or a graphical interface, or can be the system manager, or any other third party. For example, in the scenario that the BDA or MU is not capable to receive or process instructions about how to modify the uplink gain, then the BDA monitor is able to provide the gain adjustment instruction to an NMS (network management system) such that the user of the BDA or DAS can manually adjust the BDA or DAS uplink gain.

Figure 7:
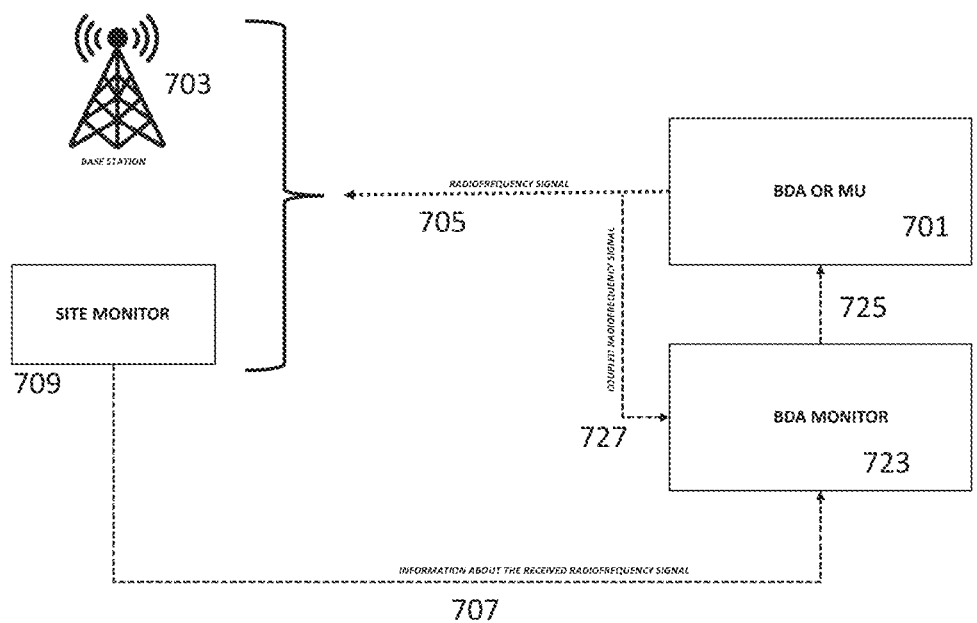
FIG. 7 illustrates a system to reduce the Near-Far effect in a wireless communication system including a base station transceiver, a site monitor, a BDA monitor, and a bidirectional amplifier or Master Unit in accordance with one embodiment.

FIG. 7 shows a BDA or a DAS MU 701 that is transmitting at least one radiofrequency signal towards at least one Base Station receiver 703, and a BDA Monitor 723 that is hardwired or wirelessly connected to the BDA or MU 701. The BDA Monitor 723 is coupled to the BDA or MU RF port that is transmitting the uplink radiofrequency signal, and via a wired or wireless connection 707, the BDA Monitor 723 receives information directly or indirectly from the Base Station 703 and/or Site Monitor 709 about the power level of the RF uplink signal received at the Base Station 703 or Site Monitor 709. Using that information, the BDA Monitor 723 adjusts 725 the BDA or MU uplink gain or uplink maximum output power level in order for the RF uplink signal to be transmitted with the proper power to reach the Base Station at a predefined value.

In another embodiment the BDA Monitor 723 provides either the information corresponding to the power level of the RF uplink signal received by the Base Station 703 or instructions about the adjustments to be made on the uplink parameters to a third party, where a third party can be a software, or a graphical interface, or can be the system manager, or any other third party.

Figure 8:
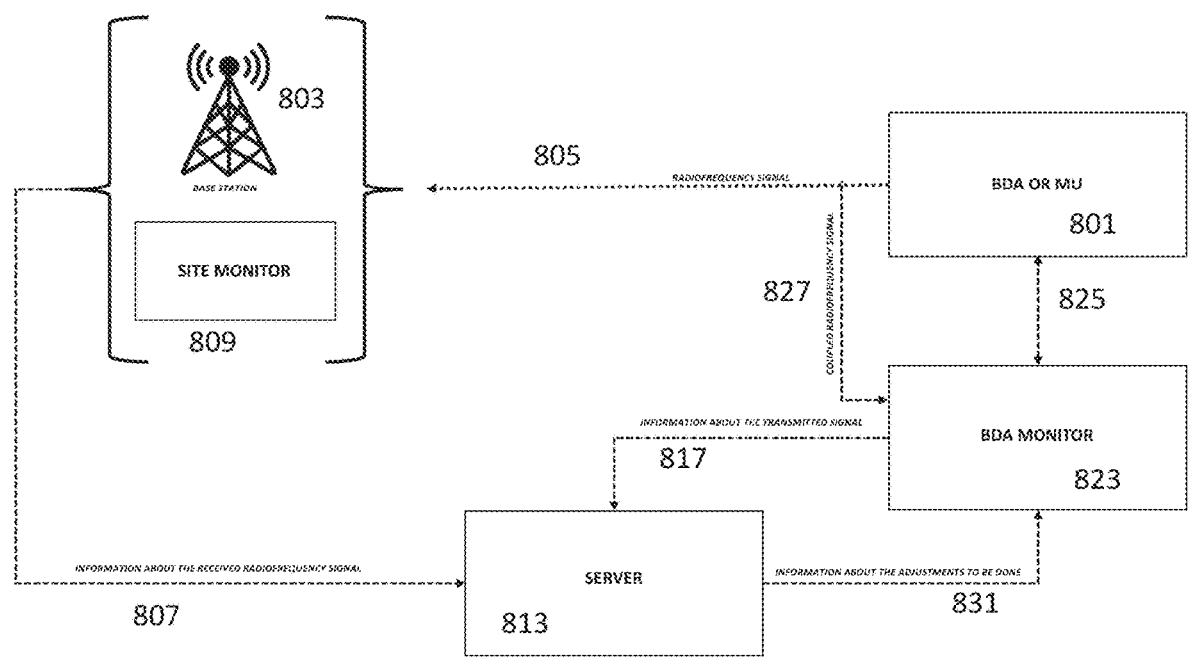
FIG. 8 illustrates a system to reduce the Near-Far effect in a wireless communication system including a base station transceiver, a server, a site monitor, a BDA monitor, and a bidirectional amplifier or Master Unit in accordance with one embodiment.

FIG. 8 shows a Server 813 that is connected to the Base Station receiver 803 and/or the Site Monitor Box 809, and connected to the BDA Monitor 823, with the BDA Monitor 823 being connected 825 to the BDA or MU 801. The Server 813 receives information 807 from the Base Station receiver 803 or Monitor Box 809 about the power level of the RF uplink signal received at the Base Station receiver 803 or Site Monitor Box 809, and the Server 813 receives information from the BDA Monitor 823 about the power level of the RF uplink signal transmitted by the BDA or MU 801. The Server 813 then indicates to the BDA Monitor 823 the necessary adjustments 831 to be performed on the BDA or MU uplink parameters.

Another embodiment includes the same Server of FIG. 8, but instead of the Server indicating to the BDA Monitor the necessary adjustments to be performed on the BDA or MU uplink parameters, the Server provides the BDA Monitor with information corresponding to the power level of the RF uplink signal received by the Base Station receiver or Site Monitor Box.

Figure 9:
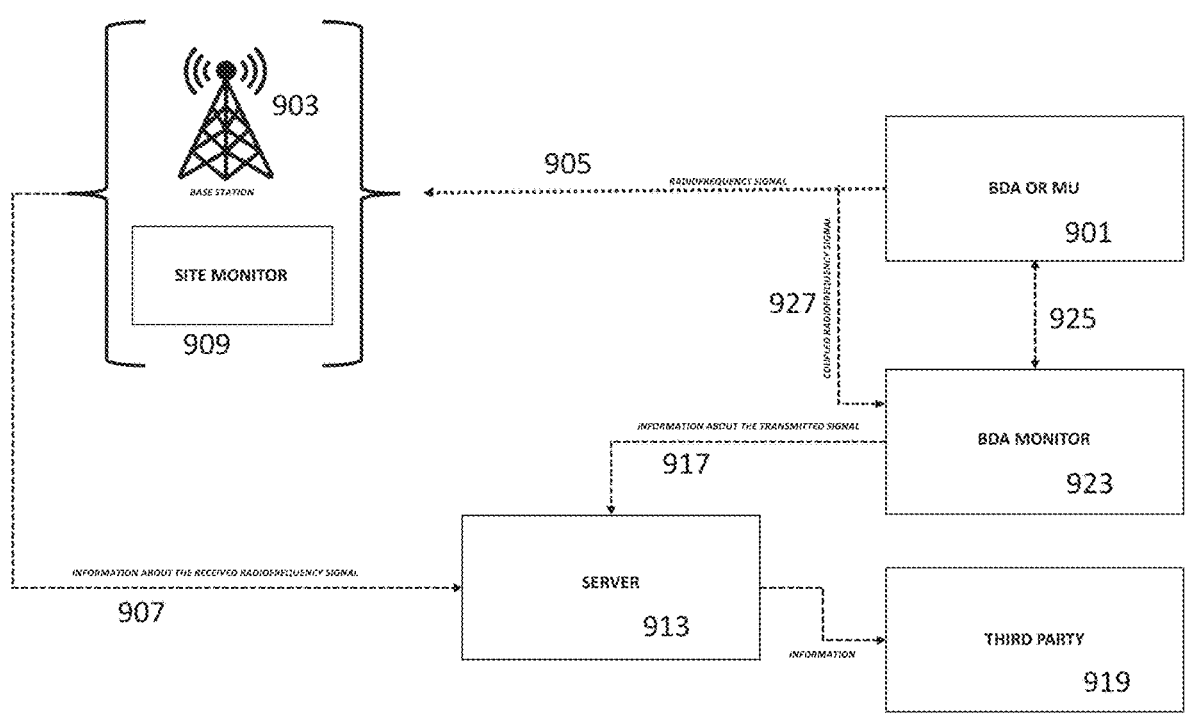
FIG. 9 illustrates a system to reduce the Near-Far effect in a wireless communication system including a base station transceiver, a server, a site monitor, a BDA monitor, and a bidirectional amplifier or Master Unit in accordance with one embodiment.

FIG. 9 shows the same scenario as FIG. 8, but the Server 913 provides to a third party 919 the information about the power level of the RF uplink signal received at the Base Station receiver or Site Monitor Box, and/or information about the power level of the RF uplink signal transmitted by the BDA or MU, where a third party can be a software, or a graphical interface, or can be the system manager, or any other third party.

In another embodiment the Server provides information to the third party about the adjustments needed on the BDA or MU uplink parameters.

Figure 10:
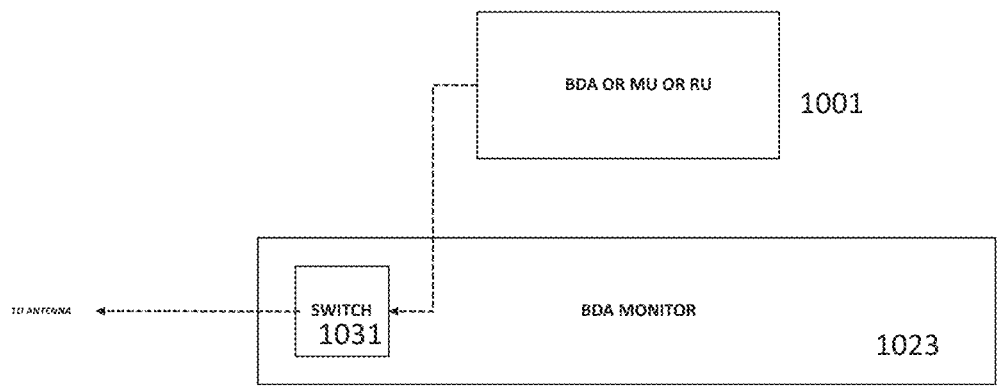
FIG. 10 illustrates a system to reduce the Near-Far effect in a wireless communication system including a bidirectional amplifier or Master Unit or a Remote Unit, a BDA monitor, and a switch in accordance with one embodiment.

FIG. 10 shows a BDA Monitor 1023 that is connected to at least one port of the BDA or MU or RU 1001, and also connected to at least one radiating antenna. The BDA Monitor 1023 has one radiofrequency switching device 1031 such as, but not limited to, a mechanical relay, that the BDA Monitor 1023 uses to connect or disconnect the radiating antenna and to or from the BDA or MU or RU 1001. FIG. 10 describes a method where the BDA monitor 1023 can disconnect the output of the BDA or DAS from the antenna in case the BDA or DAS cannot receive external commands to turn the output off in the event that the output of the BDA or DAS is required to be turned off. Under certain circumstances the BDA or DAS may be required to be turned off and sometimes it becomes impossible to do it remotely because some BDAs or DAS do not support remote commands requesting shutting them off, so in this case the BDA monitor, by having an embedded switch, disconnects the antenna from the BDA or DAS, which is the equivalent of turning off the BDA or DAS.

Figure 11:
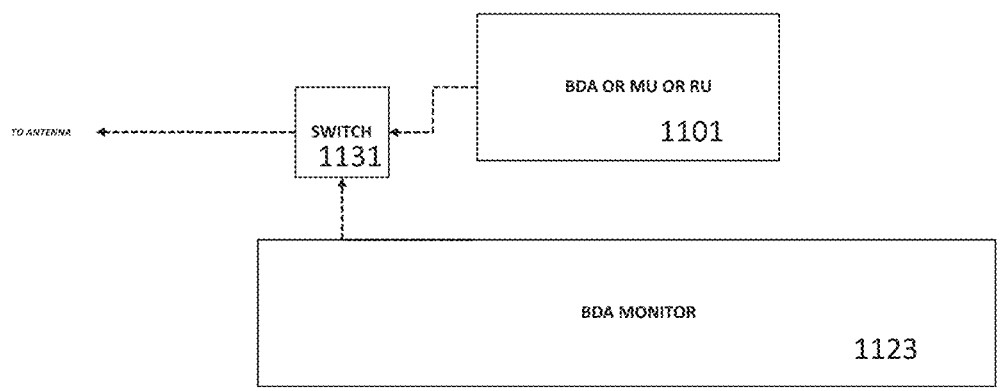
FIG. 11 illustrates a system to reduce the Near-Far effect in a wireless communication system including a bidirectional amplifier or Master Unit or a Remote Unit, a BDA monitor, and a switch in accordance with one embodiment.

FIG. 11 shows the BDA Monitor 1123, the BDA or DAS MU or DAS Remote Unit ("RU") 1101 and a switching device 1131 such as, but not limited to, a mechanical relay, where at least one port of the BDA or MU or RU 1101 is connected to one port of the switching device 1131, a radiating antenna is connected to a second port of the switching device 1131, and the switching device 1131 is managed by the BDA Monitor 1123. The switching device 1131 is an external device from the BDA Monitor 1123, and the BDA Monitor 1123 uses it to connect or disconnect the radiating antenna and the BDA or MU or RU 1101. In the embodiment illustrated in FIG. 11, the switch 1131 is not embedded into the BDA monitor 1123, but is an external part controlled by the BDA monitor.

Figure 12:
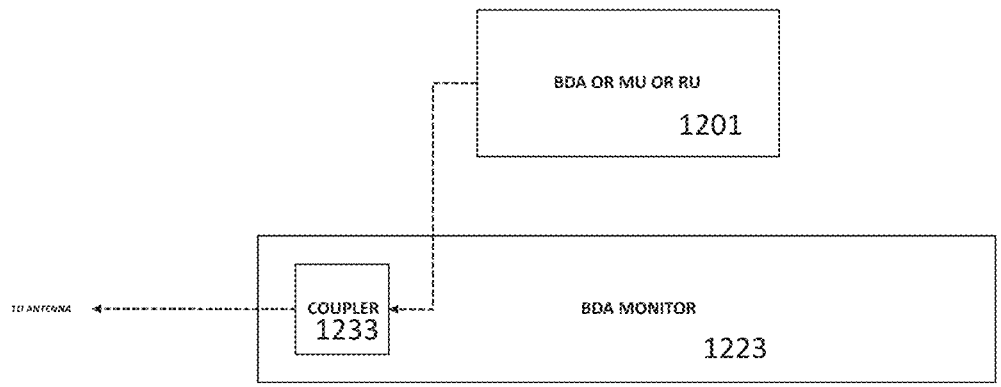
FIG. 12 illustrates a system to reduce the Near-Far effect in a wireless communication system including a bidirectional amplifier or Master Unit or a Remote Unit, a BDA monitor, and a coupling device in accordance with one embodiment.

FIG. 12 shows a BDA Monitor 1223 that is connected to at least one port of the BDA or MU or RU 1201, the BDA Monitor 1223 being connected to at least one radiating antenna, with the BDA Monitor 1223 having one radiofrequency coupling device 1233 such as, but not limited to, a coupler, that the BDA Monitor 1223 uses to couple a portion of the BDA or MU or RU transmitted signal, in order for the BDA Monitor 1223 to receive information about the BDA or MU or RU transmitted signal. In the embodiment illustrated in FIG. 12, the BDA monitor 1223 "learns" (e.g., is capable of measuring and getting the power levels) about the BDA or DAS uplink transmitted signal output power if the BDA or DAS 1201 cannot provide that information to the BDA monitor 1223.

Figure 13:
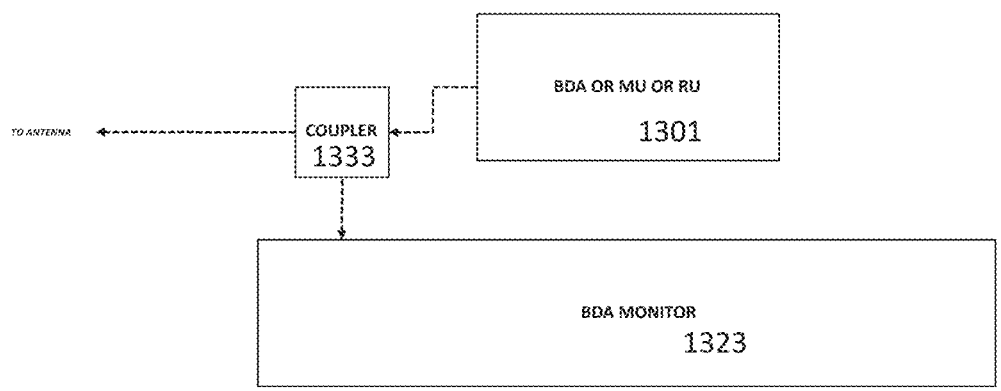
FIG. 13 illustrates a system to reduce the Near-Far effect in a wireless communication system including a bidirectional amplifier or Master Unit or a Remote Unit, a BDA monitor, and a coupling device in accordance with one embodiment.

FIG. 13 shows the BDA Monitor, the BDA or MU or RU and a radiofrequency coupling device such as, but not limited to, a coupler, where at least one port of the BDA or MU or RU is connected to one port of the radiofrequency coupling device, and a radiating antenna is connected to a second port of the radiofrequency coupling device, and the radiofrequency coupling device is hardwired or wirelessly connected to the BDA Monitor, in order for the BDA Monitor to receive information about the BDA or MU or RU transmitted signal. In the embodiment illustrated in FIG. 13, the coupler is not embedded into the BDA monitor, but is an external part connected to the BDA monitor.

Figure 14:
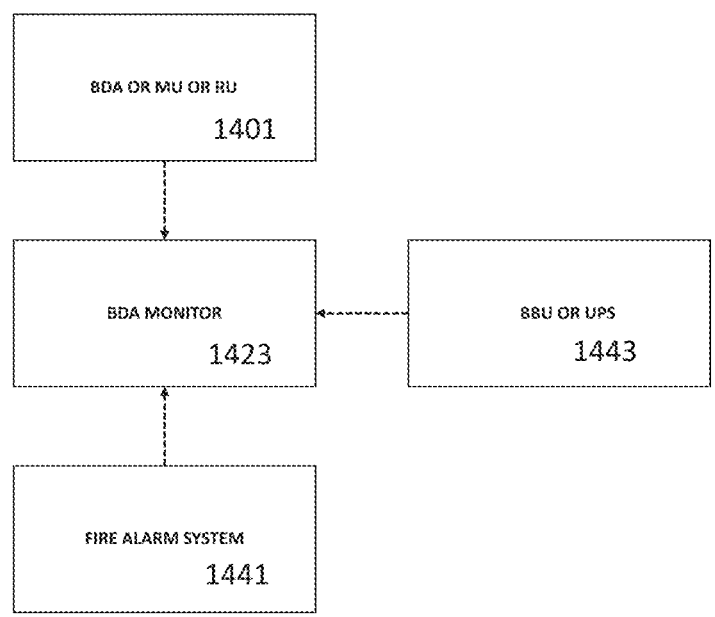
FIG. 14 illustrates a system to reduce the Near-Far effect in a wireless communication system including a bidirectional amplifier or Master Unit or a Remote Unit, a fire alarm system, a BDA monitor, and a Battery Backup Unit or Uninterruptible Power Supply in accordance with one embodiment.

FIG. 14 shows a BDA Monitor 1423 that is hardwired or wirelessly connected to a BDA or MU or RU 1401, and/or hardwired or wirelessly connected to a Battery Backup Unit ("BBU") and/or Uninterruptible Power Supply ("UPS") 1443, and/or hardwired or wirelessly connected to a Fire Alarm System 1441, where the BDA Monitor 1423 receives information from one or all of the connected devices and/or the BDA Monitor 1423 provides information to one or all the connected devices. There are some jurisdictions in which a BDA or DAS is deployed as part of a Public Safety application that require all the alarms related to the BDA or DAS, and BBU or UPS, to be connected to a fire alarm system. In the embodiment illustrated in FIG. 14, the BDA monitor 1423 receives all the alarms outputs from the BDA or DAS 1401, and from the BBU or UPS 1443, and communicates those alarms to the main fire alarm system of the Public Safety system.

Figure 15:
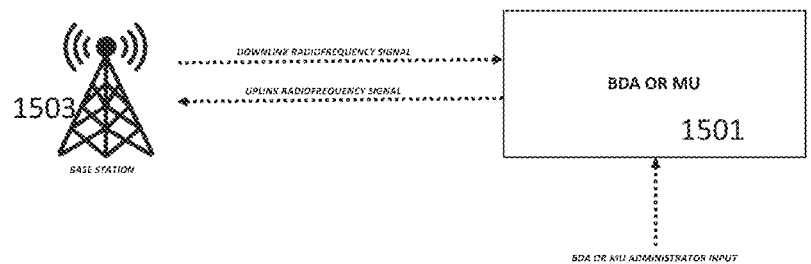
FIG. 15 illustrates a system to reduce the Near-Far effect in a wireless communication system including a base station transceiver and a bidirectional amplifier or Master Unit in accordance with one embodiment.

FIG. 15 shows a BDA or MU 1501 that receives at least one downlink (DL) signal from at least one BTS 1503. The BDA or MU 1501 receives an INPUT from the BDA or MU ADMINISTRATOR indicating the DL signal power level at the BTS 1503, which can be DL power at the BTS output or the DL power at the BTS antenna, or the DL radiated power at the BTS antenna. The BDA or MU 1501 measures the DL signal received power and compares it with the ADMINISTRATOR provided information, and based on the calculation of power difference, the BDA or MU 1501 can determine the attenuation of the DL signals from the BTS to the BDA or MU, referred as pathloss, and using the calculated pathloss value, the BDA or MU 1501 can adjust the BDA or MU uplink (UL) output power level.

The present disclosure also describes another system that solves the problems with the prior art with respect to the Near-Far effect. The exemplary implementations disclosed herein and illustrated in FIGS. 16-19 include a BDA or DAS that may control the output noise and the power level of the output signals (uplink or downlink) to achieve a seamless performance and not allow the Near-Far effect to negatively impact the Base Station performance. Further, the BDA or DAS may control the output noise and the power level of the output signals (uplink or downlink) in a manner that does not affect the performance of the macro network or the coverage area. For example, in the uplink direction it helps to avoid the Near-Far effect and in the downlink direction it does not cause an increase in the noise floor within the indoor coverage area in the downlink band.

Figure 16:
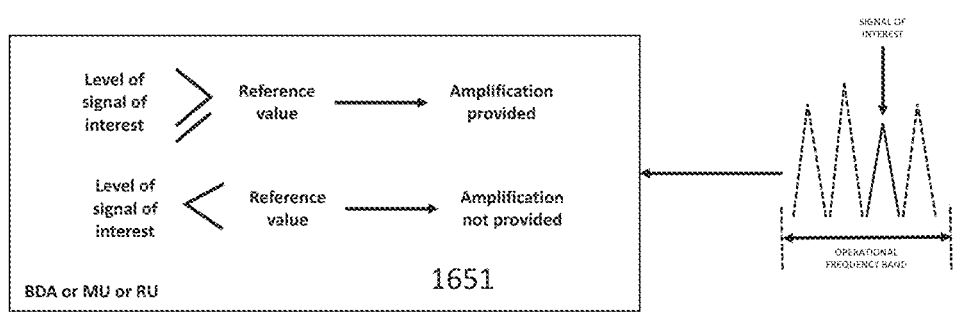
FIG. 16 illustrates a system to reduce the Near-Far effect in a wireless communication system including a bidirectional amplifier or Master Unit or a Remote Unit, in accordance with one embodiment.

FIG. 16 illustrates a BDA or MU or RU 1651 that does not have a frequency channel selective amplification capability, but that can amplify any signal (uplink or downlink) that is received at one input port of the BDA or MU or RU 1651 and that is within the BDA's or MU's or RU's operational frequency band or bands, whether that signal is a signal of interest to the amplifier or not.

The radio spectrum is shared by different radio operators that may have their channels all mixed. For example, the city of Miami shares the same frequency band that the Miami-Dade county and other private networks use, but each party has one or more distinct channels assigned for communications. All these channels carry signals that may be received or detected by the BDA. If for example the installation of the coverage extension system is done by the city of Miami, a signal is considered of interest if it is transmitted using one or more channels licensed by the city of Miami, but since an amplifier may not have a frequency channel selective operation, meaning that is band selective and not channel selective, the amplifier will amplify the entire band (for example, signals transmitted through channels assigned to the city of Miami, Miami Dade county and other signals from private networks).

Generally speaking, if the BDA or DAS is amplifying 10 signals, and only one signal is of interest, this means that 9 of 10 signals will be using the BDA or DAS output power and the one signal of interest will have only one tenth of the output power available. In the uplink direction this may have the effect of the signal of interest not reaching the base station with the proper value, and in the downlink it means that the signal of interest, due to having low power, may not cover the entire building or reach the entire coverage area. When squelch functionality is implemented, and the BDA or DAS triggers the squelch just because a signal within its operational band is present at the input, then the BDA or DAS will be active all the time that a signal of interest or not of interest will be present, meaning that 9 of 10 times the BDA will be radiating noise to the base station in the uplink direction with no traffic of interest.

In FIG. 16, in one exemplary implementation the BDA or DAS 1651 detects when a signal of interest, that uses a licensed known frequency channel, is present and then the BDA or DAS 1651 will trigger the squelch, amplify the signal of interest, and the noise at the output will be only transmitted when the BDA is serving a signal of interest, but during the rest of the time, even if a signal is present but is not a signal of interest, then the BDA will not amplify, hence no noise will be radiating towards the base station.

The BDA or MU or RU 1651 may incorporate a power meter to measure the level of at least one of the signals of interest received by at least one input port of the BDA or MU or RU, and in the event that the measured input level of that one signal of interest is equal or higher than a reference value, the BDA or MU or RU 1651 may amplify the input signals received by that one input port, where the reference value may be programmed or set by the installer or system owner or any system monitor or controller. The reference value can be any value defined by the installer of the BDA or DAS and may be defined as a tradeoff value for a signal to reach the base station with just enough power not to overdrive the base station receiver, and/or not to create the Near-Far effect, or other considerations. The power meter may have a circuitry based on digital or IF filters that, out of the measured signals, the filter filters only the one signal of interest, previously setup by the system administrator, which means that the power reading from the power meter will correspond to the filtered signal or the signal of interest.

In an alternative embodiment the BDA or MU or RU 1651 may constantly be providing amplification but the amplified input signals reach one output port when one signal of interest is equal or higher than the aforementioned reference value. The alternative embodiment follows the same criteria than the previous point but instead of having a squelch functionality that controls the gain, it may connect or disconnect the output, or can turn off and on the output amplifier, or may implement different ways to control the signals and noise to reach the antenna towards the base station.

Figure 17:
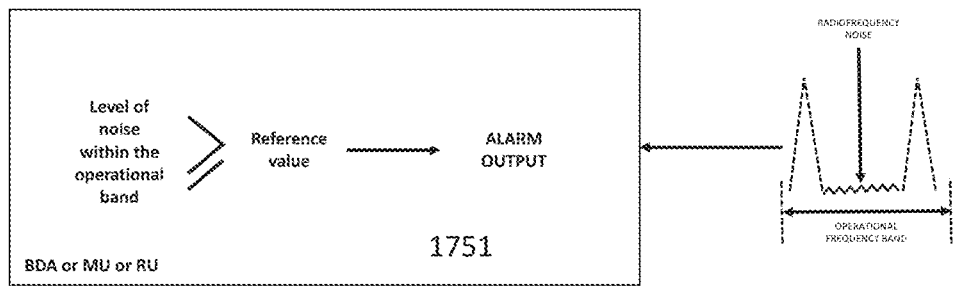
FIG. 17 illustrates a system to reduce the Near-Far effect in a wireless communication system including a bidirectional amplifier or Master Unit or a Remote Unit, in accordance with one embodiment.

FIG. 17 illustrates a BDA or MU or RU 1751 that measures the radiofrequency noise present at one input port within its operational frequency band or bands, and in the event that the input level of the radiofrequency noise is equal or higher than a reference value which may be determined by the radio communication system administrator, the BDA or MU or RU 1751 may generate an alarm output that can be implemented through use of a dry contact operation, a visual indicator such as a LED, an SNMP trap, or any other method, where the reference value may be programmed or set by the installer or system owner or any system monitor or controller. The alarm generated by the BDA or a MU or a RU 1751 may be communicated to an external destination, such as a fire alarm box or others.

In an alternative embodiment, the BDA or a MU or a RU 1751 may measure the radiofrequency noise present at one input port and within the radiofrequency channel of at least one of the signals of interest, and in the event that the input level of the radiofrequency noise within the said radiofrequency channel of at least one of the signals of interest is equal or higher than the said reference value, the BDA or MU or RU may generate the aforementioned alarm output.

Figure 18:
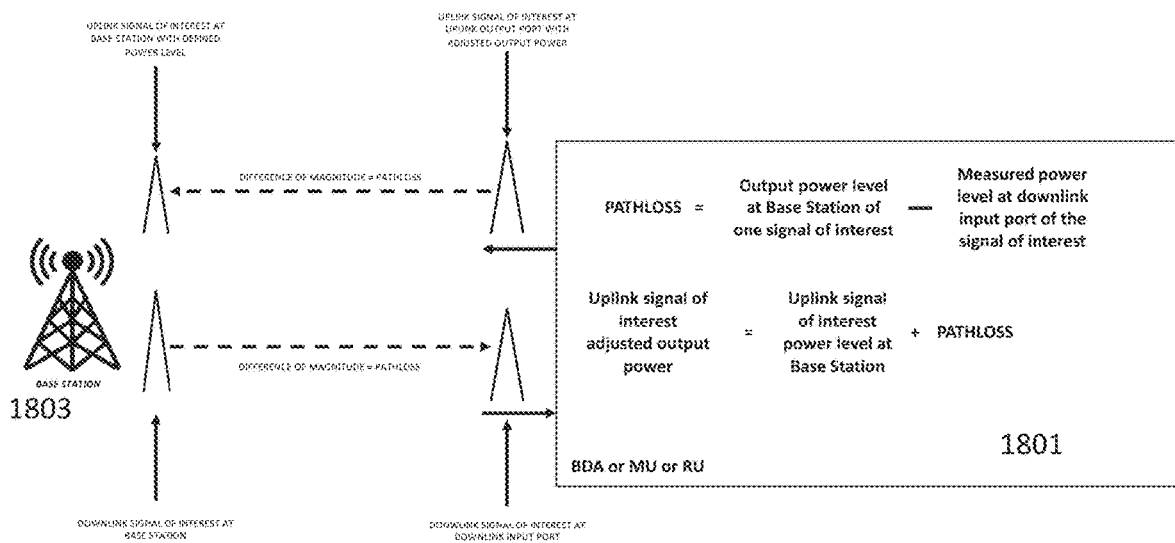
FIG. 18 illustrates a system to reduce the Near-Far effect in a wireless communication system including a base station transceiver and a bidirectional amplifier or Master Unit or a Remote Unit, in accordance with one embodiment.

FIG. 18 illustrates a BDA or MU or RU 1801 that has the capability to adjust the output power level of each of the signals of interest being amplified in the uplink direction and received at one uplink output port, in order for the uplink signals of interest to reach the Base Station 1803 with a particular or desired power level value, where that defined value may be programmed or set by the installer or system owner or any system monitor or controller. The magnitude difference between the output power level of each of the signals of interest being amplified and the defined value to reach the base station, referred to as pathloss, is calculated as the difference between the Base Station output power level of at least one of the signals of interest in the downlink and the measured value of that said downlink signals at one downlink input port of the BDA or MU or RU 1801, where the defined value of the Base Station output power level of at least one of the signals of interest in the downlink may be programmed or set by the installer or system owner or any system monitor or controller, and where the BDA or MU or RU has the capability to measure the input level of at least one of the downlink signals of interest. The one uplink output port and the one downlink port can be either the same physical port or can be separated physical ports. For example, one can have a BDA or DAS with a single to base connector with uplink and downlink duplexed, or can have two or more to base connectors, with a mix of separated or duplexed uplink and downlink.

Figure 19:
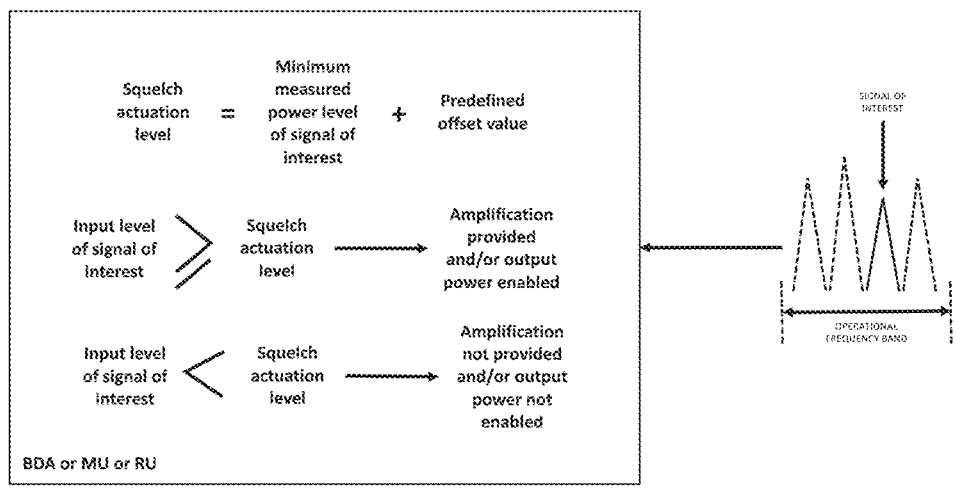
FIG. 19 illustrates a system to reduce the Near-Far effect in a wireless communication system including a bidirectional amplifier or Master Unit or a Remote Unit, in accordance with one embodiment.

FIG. 19 illustrates a BDA or MU or RU 1901 that includes an uplink squelch functionality to avoid providing uplink amplification and/or uplink output power enabling when the power level of one of the uplink signals of interest level received by BDA or MU or RU 1901 is below a certain value at one uplink input port, referred to as squelch actuation level, and where the said BDA or MU or RU has the capability to measure the uplink input level of one of the signals of interest at one uplink input port, that can determine the lowest input level of that said signal of interest. Based on that lowest level, the BDA or MU or RU can define the squelch actuation level by applying a certain predefined offset value to the lowest level, where that offset value may be programmed or set by the installer or system owner or any system monitor or controller, and where that offset value may be a positive or negative magnitude.

With respect to the offset value, in one exemplary implementation the squelch may be triggered 5 dBm lower than the lowest received signal of interest, meaning that even transmitting from the farthest indoor location, the BDA or DAS will be triggered. By contrast, if it is not desired to configure the system so that it is so sensible, the squelch may be triggered only if the signals are 5 dbm above the lowest received signal (which may happen if temporarily it is desired to provide amplification to close-to-the-antennas radios and not those that are far away), and that is why the offset can be positive or negative.

In one implementation, the gain of the amplification chain may be reduced, so that no amplified signals and noise are present at the output, or the output amplifier may be turned off or on, or the output connector may be connected or disconnected.

In one implementation, the BDA or DAS will have a priori knowledge of which radiofrequency channel the signals of interest are. Alternatively, the BDA may obtain that information from the downlink control channels.

In one implementation, through use of control software, the installer may require or configure the BDA to start monitoring a specific uplink channel in which the BDA installer is operating a radio that transmits at all times. The installer may walk through the entire indoor location/coverage area, and then the BDA will constantly read the received uplink signals coming from that radio. When the radio is close to the indoor antennas, the reading at the BDA will be higher than when the installer walks far away from the indoor antennas, and during that time the lowest received signal will be the one received when the radio is very far away from the BDA antenna but still inside the indoor location.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims. Further, the limitations of the following claims are not written in means—plus-function format and are not intended to be interpreted based on 35 U.S.C. 112(f), unless and until such claim limitations expressly use the phrase "means for" followed by a statement of function void of further structure.

The invention claimed is:

1. A communication system comprising:
   a base station for receiving uplink radio frequency signals from a bidirectional amplifier or Master Unit and for measuring a first power level of said uplink radio frequency signals when received by the base station;
   a site monitor, adjacent to the base station, for receiving said uplink radio frequency signals from said bidirectional amplifier or Master Unit and for measuring a second power level of said uplink radio frequency signals when received by the site monitor; and
   a server in communication with said base station or said site monitor and in communication with said bidirectional amplifier or Master Unit;
   wherein the server is configured to receive information corresponding to said first power level from the base station or said second power level from the site monitor;
   wherein the bidirectional amplifier or Master Unit measures a transmitted power level of said uplink radio frequency signals when transmitted by the bidirectional amplifier or Master Unit and said server is configured to receive information corresponding to said transmitted power level from said bidirectional amplifier or Master Unit; and
   wherein the server calculates an uplink amplification gain for the bidirectional amplifier or Master Unit to be set to based on said transmitted power level and said first power level or said second power level so that uplink radio frequency signals to be transmitted by the bidirectional amplifier or Master Unit reach the base station with an acceptable signal level without degrading the performance of the base station receiver; wherein the server communicates the calculated uplink amplification gain to the bidirectional amplifier or Master Unit; and
   wherein the bidirectional amplifier or Master Unit sets an uplink amplification gain to the calculated uplink amplification gain.

2. The system of claim 1, wherein the site monitor is connected to the base station and receives information corresponding to said first power level from the base station; and wherein said first power level is the same as said second power level.

3. The system of claim 1, wherein the site monitor is not connected to the base station.

4. The system of claim 1, wherein the bidirectional amplifier or Master Unit includes a microcontroller that sets the uplink amplification gain to the calculated uplink amplification gain.

5. A communication system comprising:
   a base station for receiving uplink radio frequency signals from a bidirectional amplifier or Master Unit and for measuring a first power level of said uplink radio frequency signals when received by the base station;
   a site monitor, adjacent to the base station, for receiving said uplink radio frequency signals from said bidirectional amplifier or Master Unit and for measuring a second power level of said uplink radio frequency signals when received by the site monitor; and
   a server in communication with said base station or said site monitor and in communication with said bidirectional amplifier or Master Unit;

wherein the server is configured to receive information corresponding to said first power level from the base station or said second power level from the site monitor;

wherein the bidirectional amplifier or Master Unit measures a transmitted power level of said uplink radio frequency signals when transmitted by the bidirectional amplifier or Master Unit and said server is configured to receive information corresponding to said transmitted power level from said bidirectional amplifier or Master Unit;

wherein the server calculates an uplink output power for the bidirectional amplifier or Master Unit to be set to based on said transmitted power level and said first power level or said second power level so that uplink radio frequency signals to be transmitted by the bidirectional amplifier or Master Unit reach the base station with an acceptable signal level without degrading the performance of the base station receiver;

wherein the server communicates the calculated uplink output power to the bidirectional amplifier or Master Unit; and wherein the bidirectional amplifier or Master Unit sets an uplink output power to the calculated uplink output power.

6. The system of claim 5, wherein said calculated uplink output power is a maximum power to avoid a Near Far effect.

7. The system of claim 6, wherein the bidirectional amplifier or Master Unit includes a microcontroller that sets the uplink output power to the calculated uplink output power.

8. The system of claim 5, wherein the bidirectional amplifier or Master Unit includes a microcontroller that sets the uplink output power to the calculated uplink output power.

9. A communication system comprising:
a base station for receiving uplink radio frequency signals from a bidirectional amplifier or Master Unit and for measuring a first power level of said uplink radio frequency signals when received by the base station;
a site monitor, adjacent to the base station, for receiving said uplink radio frequency signals from said bidirectional amplifier or Master Unit and for measuring a second power level of said uplink radio frequency signals when received by the site monitor; and
a server in communication with said base station or said site monitor and in communication with a BDA monitor, the BDA monitor being coupled to an uplink output port of said bidirectional amplifier or Master Unit;
wherein the server is configured to receive information corresponding to said first power level from the base station or said second power level from the site monitor;
wherein the BDA monitor measures a transmitted power level of said uplink radio frequency signals when transmitted by the bidirectional amplifier or Master Unit and said server is configured to receive information corresponding to said transmitted power level from said BDA monitor;

wherein the server calculates an uplink amplification gain for the bidirectional amplifier or Master Unit to be set to based on said transmitted power level and said first power level or said second power level so that uplink radio frequency signals to be transmitted by the bidirectional amplifier or Master Unit reach the base station with an acceptable signal level without degrading the performance of the base station receiver;

wherein the server communicates the calculated uplink amplification gain to the BDA monitor; and wherein the BDA monitor adjusts an uplink amplification gain of the bidirectional amplifier or Master Unit to the calculated uplink amplification gain.

10. The system of claim 9, wherein the site monitor is connected to the base station and receives information corresponding to said first power level from the base station; and wherein said first power level is the same as said second power level.

11. The system of claim 9, wherein the site monitor is not connected to the base station.

12. A communication system comprising:
a base station for receiving uplink radio frequency signals from a bidirectional amplifier or Master Unit and for measuring a first power level of said uplink radio frequency signals when received by the base station;
a site monitor, adjacent to the base station, for receiving said uplink radio frequency signals from said bidirectional amplifier or Master Unit and for measuring a second power level of said uplink radio frequency signals when received by the site monitor; and
a server in communication with said base station or said site monitor and in communication with said bidirectional amplifier or Master Unit;
wherein the server is configured to receive information corresponding to said first power level from the base station or said second power level from the site monitor;
wherein the bidirectional amplifier or Master Unit measures a transmitted power level of said uplink radio frequency signals when transmitted by the bidirectional amplifier or Master Unit and said server is configured to receive information corresponding to said transmitted power level from said bidirectional amplifier or Master Unit;

wherein the server calculates an uplink output power for the bidirectional amplifier or Master Unit to be set to based on said transmitted power level and said first power level or said second power level so that uplink radio frequency signals to be transmitted by the bidirectional amplifier or Master Unit reach the base station with an acceptable signal level without degrading the performance of the base station receiver;

wherein the server communicates the calculated uplink output power to the BDA monitor; and wherein the BDA monitor adjusts an uplink output power of the bidirectional amplifier or Master Unit to the calculated uplink output power.

13. The system of claim 12, wherein said calculated uplink output power is a maximum power to avoid a Near Far effect.

* * * * *